Patented June 7, 1932

1,862,315

UNITED STATES PATENT OFFICE

CHARLES G. MERRELL, OF WYOMING, AND MORTIMER BYE, OF CINCINNATI, OHIO, ASSIGNORS TO THE WILLIAM S. MERRELL COMPANY, OF CINCINNATI, OHIO, A CORPORATION OF OHIO

PRODUCT OF CASTOR OIL

No Drawing. Application filed March 9, 1928, Serial No. 260,542, and in Canada February 17, 1928.

It is the object of our invention to provide a product of castor-oil, that will retain the therapeutic action of castor-oil, but be devoid of the nauseating taste and oily characteristics thereof.

We have discovered that when a small amount of alkaline material, dissolved in water, is mixed with castor-oil, that there is produced a milky substance, that has a not unpleasant taste; a consistency unlike the oily consistency of castor-oil; and the laxative properties of castor-oil.

We have found that the relative proportions of the alkali and the castor-oil vary somewhat, with different alkalis, in order to obtain an emulsion having the desirable qualities aforesaid.

A proportion of 7/100 per cent of sodium hydroxide or of 7/100 per cent of potassium hydroxide, or 7/100 per cent combination of sodium hydroxide and potassium hydroxide, to eighty per cent of castor oil and nineteen per cent of water, produces an emulsion that has the desirable qualities aforesaid.

Other quantities of these alkalis than those mentioned above will produce emulsions, but we find that if the quantity of alkalis is increased to, say 1/5%, the resulting product has an objectionable alkaline taste, while if the quantity is decreased lower than 1/8%, the emulsion tends to break up or separate. A proportion of eighty per cent of castor-oil to five per cent of milk of magnesia, the balance being water, will produce a similar emulsion.

Fixed oil, such as corn oil, olive oil, peanut oil, etc., may be added to the above products (preferably to about 1/2% of the finished product) to assist in maintaining the emulsified consistency originally obtained.

To the emulsion could be added flavoring substances and preservative material. However, neither the flavoring materials nor the preservatives are an essential part of the emulsion. The flavoring materials may be oils, such as wintergreen, peppermint, cinnamon, etc., or other flavoring preparations. The preservatives may be sodium salicylate, sodium benzoate, or other harmless well known preservative materials.

What we claim is:

1. An emulsion consisting solely of castor-oil and an alkaline material, the proportions of the alkaline material being approximately seven one hundredths of 1% and the castor-oil more than 35% of the product.

2. An emulsion consisting of castor-oil and an alkaline hydroxide, the proportions thereof being approximately seven one hundredths of 1% of the alkaline hydroxide and more than 70% of the castor-oil.

3. An emulsion consisting solely of castor-oil and milk of magnesia, the proportions thereof being approximately 5% milk of magnesia and 80% of castor-oil.

4. An emulsion consisting solely of castor oil and an alkaline material wherein the castor oil is more than 35% of the product and the alkaline material, according to its alkalinity is in such quantity as to prevent saponification of the mass and to produce emulsification of the entire mass such alkaline material ranging in quantity from seven one hundredths of one per cent to five per cent.

5. An emulsion consisting solely of castor oil and a material having the alkaline qualities characterized in sodium hydroxide, potassium hydroxide and milk of magnesia, the castor oil being more than 35% of the mass and the alkaline material being of such quantity as to produce an emulsion and to preclude saponification of the mass, such alkaline material ranging in quantity from seven one hundredths of one per cent to five per cent.

6. As a new therapeutic, a thick creamy laxative product comprising thirty-five per cent to eighty per cent of castor oil wherein the sole emulsifying agent is sodium hydroxide in the proportion of approximately seven one hundredths of one per cent of the mass, the remainder being water.

7. A thick creamy castor oil emulsion, devoid of nauseating and alkaline tastes comprising approximately seven one hundredths of one per cent of alkali as the sole emulsifier with water.

8. A castor oil product of therapeutic value and devoid of nauseating and alkaline tastes comprising sodium hydroxide in the proportion of approximately seven one hundredths of one per cent of the mass.

9. A therapeutic product of castor oil free of nauseating taste and comprising five per cent of milk of magnesia, fifteen per cent of water and eighty per cent of castor oil.

10. A therapeutic emulsion of castor oil devoid of nauseating taste and comprising five per cent of milk of magnesia as the sole emulsifying agent.

In testimony whereof, we have hereunto subscribed our names this 3rd day of March, 1928.

CHARLES G. MERRELL.
MORTIMER BYE.